United States Patent Office 3,252,978
Patented May 24, 1966

3,252,978
PRODUCTION OF CYANURIC ACID
Paxton R. Candler, Hopewell, and Donald Pickens, Chester, Va., assignors to Allied Chemical Corporation, New York, N.Y., a corporation of New York
No Drawing. Filed Apr. 29, 1963, Ser. No. 276,169
8 Claims. (Cl. 260—248)

This invention relates to the production of cyanuric acid from urea. More particularly, it relates to the production of cyanuric acid by heating urea in a urea-glycol ether solvent.

The production of cyanuric acid by pyrolysis of urea is well known. Equally well known, however, is the fact that serious operational difficulties are encountered if the cyanuric acid product is permitted to harden on the reaction vessel. Accordingly, much effort has been devoted to providing means for carrying out this reaction without resultant caking of the product on the reactor parts. Among the suggested methods is the use of various liquid reaction media, including inert hydrocarbon oils, phenol, and glycol ethers. The latter have been found to be especially advantageous where a product free from discoloration and disagreeable odors is desired. It is believed that one mole of the glycol ether reacts with one mole of urea to form a carbamate product, which carbamate along with unreacted glycol ether acts as the medium in which additional urea is converted to cyanuric acid.

Glycol ethers are relatively costly, and hence it is not surprising that the prior art calls for elaborate purification and recirculation methods for assuring that maximum use will be made of this solvent. It has been found, furthermore, that when glycol ethers are employed in accordance with known procedures for producing cyanuric acid, a significant amount of this solvent is lost, thus adding greatly to the cost of commercial operation.

It is, therefore, an object of this invention to provide a more economical method of producing cyanuric acid from urea.

It is a further object to produce, in high yields, a cyanuric acid product of high purity, while substantially reducing glycol ether loss.

We have discovered that these and other objects may be achieved by heating urea in the presence of a glycol ether carbamate solvent in an inert atmosphere.

More specifically, we have discovered that when urea is heated to 220°–270° C. in a glycol ether carbamate solvent, loss of glycol ether may be substantially reduced by first removing the air and oxygen from the reactor and substituting an inert gas.

The specific inert gas used is not critical. Nitrogen or ammonia are normally used, the latter being particularly advantageous because of its ready availability as a by-product of the instant process.

The glycol ethers used in making the carbamate solvents of this process include the lower monoalkylethers of the lower mono- and di-alkylene glycols, including the methyl, ethyl, and propyl ethers of ethylene glycol, diethylene glycol, propylene glycol, and dipropylene glycol.

In order to obtain a product substantially free from discoloration it is necessary to employ a glycol ether of high purity. We have found that a good product can be assured by first subjecting the glycol ether to a purification treatment which comprises heating the glycol ether with about 1–10% by weight urea and distilling the resulting mixture to remove about 2% low boilers and about 2% high boilers.

We have also found that significantly higher yields are obtained when the process of our invention is carried out under superatmospheric pressure.

In typical operations employing our process, a closed reactor equipped with agitator and suitable feed means is swept with ammonia to remove substantially all oxygen and air. The reactor, under a pressure of about 15 to 70 p.s.i.g. ammonia, is then charged with molten urea and a carbamate solvent prepared by reacting urea and glycol monomethyl ether in 1:1 molar ratio in the presence of excess glycol ether in an inert atmosphere. The contents of the reactor are heated to about 230–250° C. with resultant evolution of ammonia, which is vented and scrubbed for use in purifying the crude cyanuric acid product in accordance with the method disclosed in U.S. Patent 3,172,886, issued March 9, 1965. Pressure is maintained at about 15–70 p.s.i.g., preferably about 15–60 p.s.i.g. The reactor effluent consisting of crude cyanuric acid and solvent is cooled to about 65° C. and is centrifuged. The separated solvent is recycled together with additional urea (sufficient to replace cyanuric acid withdrawn) at a rate to maintain a 10–35% slurry of solid cyanuric acid in the reactor. The cyanuric acid cake may be washed with water and further purified.

The following examples illustrate the significance of our invention.

*Example 1*

In a 320 ml. sealed autoclave were placed 100 g. dipropylene glycol monomethyl ether and 50 g. urea. The system was flushed several times with nitrogen so that a nitrogen atmosphere remained over the pyrolysis mixture. The autoclave was closed and heated to 240–250° C., for 4 hours. The apparatus was cooled, opened and the liquid removed from the crude solid pyrolysate by filtration. The loss of solvent amounted to 0.015 lb./lb. of cyanuric acid based on 100% conversion.

The solvent loss was determined as follows. The filter cake was extracted with ether to remove the adhering solvent, the ether evaporated and the liquid added to the original filtrate making the total weight 104 g. The dried, extracted solid weighed 35 g. and was a mixture of urea, cyanuric acid and intermediate pyrolysis products. The liquid solvent was analyzed via vapor phase chromatography and found to contain an additional 0.53 g. of "lights," materials boiling below the boiling point of dipropylene glycol monomethyl ether, when compared with the original solvent. This corresponds to a loss of about 0.015 lb. solvent/lb. of cyanuric acid based on 100% urea conversion.

When the above example was duplicated, except that its autoclave was not flushed to remove air, the solvent loss amounted to .05 lb./lb. of cyanuric acid.

*Example 2*

Carbamate solvent for the reaction was prepared batchwise as follows: A vessel equipped with a reflux condenser was evacuated to remove air and oxygen and was then filled with nitrogen. To this vessel was charged 7,830 parts by weight of dipropylene glycol monomethyl ether and 1,584 parts of urea. Heat was applied and the temperature of the mixture was raised until reflux started at about 190° C. The temperature of the mixture rose to 205° C. over a period of several hours and ammonia was evolved from the reaction mixture. The resulting mixture was cooled to room temperature and filtered to recover 8,570 parts of solvent for use in accordance with the invention. Several batches of solvent were thus prepared.

A closed reactor provided with reflux condenser and agitator and means for introducing and withdrawing slurries was stripped of air and oxygen by flushing with nitrogen and charged as follows:

1,995 parts by weight of solvent as prepared above, and 305 parts of urea were mixed in a melt pot and heated to 140° C. All of the resulting solution was then added to the reactor through a nitrogen blanketed calibrated feed tank, and pressure in the system was adjusted to about 20 p.s.i.g. by addition of nitrogen. The reactor temperature was raised to 236° C. and held at about this temperature with stirring for two hours before continuous feed was started.

Continuous operation was as follows: 1,330 parts by weight of carbamate solvent and 610 parts of urea were mixed at 135–150° C. and the resulting solution was fed to said feed tank under about two atmospheres nitrogen pressure. The solution was then fed to the stirred reactor at a rate of about 1,290 parts per hour. Slurry was removed from the reactor through a dip tube at short intervals to hold the volume in the reactor practically constant. Pressure in the reactor was about 15–20 p.s.i.g. and reactor temperature was held at about 230° C. Ammonia produced during the reaction was taken overhead through the reflux condenser.

Slurry removed from the reactor via the dip tube was cooled to about 60° C. and filtered under a nitrogen atmosphere. The filtrate was recycled to the stirred melt pot as solvent. Filter cake on the filter was washed with twice its weight of water. This wash solution was distilled to remove water and the residue was recycled to the melt pot as solvent. The dried filter cake analyzed 98% cyanuric acid; the cyanuric acid yield based on urea feed was 96%.

*Example 3*

Example 2 was repeated using atmospheric pressure and a reaction temperature of about 209° C. The product analyzed 82% cyanuric acid and the yield was 79%.

We claim:
1. In the process for producing cyanuric acid by heating urea in a glycol ether carbamate solvent, the improvement which comprises carrying out the process in an inert environment free of air and oxygen.
2. The process of producing cyanuric acid which comprises heating urea in an inert atmosphere free of air and oxygen in a glycol ether carbamate solvent which is a reaction product of urea and a glycol ether.
3. In the process for producing cyanuric acid by heating urea in a glycol ether carbamate solvent, the improvement which comprises heating the urea in said glycol ether carbamate solvent in an inert atmosphere free of air and oxygen at a pressure of about 15 to 70 p.s.i.g.
4. The process for producing cyanuric acid which comprises heating urea to about 220° to 270° C. in an inert atmosphere free of air and oxygen at a pressure of about 15 to 70 p.s.i.g. in a glycol ether carbamate solvent.
5. The process of claim 4 in which the glycol ether carbamate is a reaction product of urea and dipropylene glycol monomethyl ether.
6. The process for producing cyanuric acid which comprises feeding a glycol ether solution of the equimolar reaction product of urea and a glycol ether to a reactor which is substantially bree of air and oxygen and heating said solution to about 220° to 250° C. under a pressure of about 15 to 70 p.s.i.g. of an inert gas with sufficient additional urea to produce as reaction product a slurry containing about 10–35% solid cyanuric acid.
7. The process of claim 6 wherein the glycol ether is dipropylene glycol monomethyl ether.
8. The process of producing cyanuric acid which comprises heating a mixture of 1 part diethylene glycol monomethyl ether with about .01 to .06 part by weight urea, separating by distillation from the resulting solution two portions of about 2% by weight comprising the lowest and highest boiling constituents, heating the remaining portion, consisting essentially of purified diethylene glycol monomethyl ether, with urea in at least about 1 to 1 molar ratio in an inert atmosphere at about 160–250° C., feeding the resulting solvent and additional urea to a reactor which is substantially free of air and oxygen, and heating to about 220–250° C. under a pressure of about 15–70 p.s.i.g. of an inert gas.

References Cited by the Examiner
UNITED STATES PATENTS

| | | | |
|---|---|---|---|
| 2,952,679 | 9/1960 | Perret | 260—248 |
| 2,975,177 | 3/1961 | Christmann | 260—248 |

WALTER A. MODANCE, *Primary Examiner.*

J. M. FORD, *Assistant Examiner.*